United States Patent [19]
Eldredge et al.

[11] Patent Number: 5,501,575
[45] Date of Patent: Mar. 26, 1996

[54] FAN BLADE ATTACHMENT FOR GAS TURBINE ENGINE

[75] Inventors: David A. Eldredge, Port St. Lucie, Fla.; Robert A. Ress, Jr., Carmel, Ind.

[73] Assignee: United Technologies Corporation, Hartford, Conn.

[21] Appl. No.: 396,842

[22] Filed: Mar. 1, 1995

[51] Int. Cl.⁶ .................................................. F01D 5/32
[52] U.S. Cl. .................................. 416/144; 416/220 R
[58] Field of Search .......................... 416/144, 219 R, 416/220 R, 221

[56] References Cited

U.S. PATENT DOCUMENTS

| | | | |
|---|---|---|---|
| 4,453,890 | 6/1984 | Brantley | 416/220 R |
| 4,730,983 | 3/1988 | Naudet et al. | 416/220 R |
| 5,067,877 | 11/1991 | Youssef | 416/220 R |
| 5,112,193 | 5/1992 | Greer et al. | 416/220 R |
| 5,156,525 | 10/1992 | Ciokajlo | 416/220 R |

FOREIGN PATENT DOCUMENTS 2561307  9/1985  France ................. 416/220 R Primary Examiner—Edward K. Look
Assistant Examiner—James A. Larson
Attorney, Agent, or Firm—Norman Friedland

[57] ABSTRACT

The attachment of the blade to the disk of a gas turbine engine includes a sloped deep slot formed in the rim of the disk for accepting the dovetail of the root of he fan or compressor blade allowing the removal of a single blade from the disk and includes a segmented retainer plate disposed at the aft end of the bearing against the blade root to react out the slope induced axial blade loads providing a low hub-tip ratio configuration. A blade support disposed between the live rim of the disk and the bottom of the blade serves to support the blades radially during non-operating conditions and includes pockets for retaining weights for dynamic balance of the rotor. A forward mounted snap ring prevents forward movement of the blade during non-operating conditions.

19 Claims, 3 Drawing Sheets

FAN BLADE ATTACHMENT FOR GAS TURBINE ENGINE

This invention was made under a U.S. Government contract and the Government has rights herein.

TECHNICAL FIELD

This invention relates to the fan section of a gas turbine engine and particularly to the attachment means for fan blades to the disk of the rotor that are designed to have a low hub to tip ratio and operate at relatively high speeds.

BACKGROUND ART

As is well known in the gas turbine engine field of technology, it is desirable to operate the fan at the highest tip speed possible in order to maximize the amount of air flowing through the fan to increase thrust and to enhance engine operating performance. Many advancements have occurred over the past several years for the purpose of enhancing engine operating performances and included amongst these are light weight blades, fabrication of the rotor by integrating the disk and blades, fabricating hollow blades, and fabricating the blades from plastic and/or composite materials or a combination of this material with structural and protection parts made from metal and the like. Equally well known to the skilled artisan is the fact that exceedingly high loads are transmitted from the blades to the disks which has been a constant concern to the aircraft engine designer. Axiomatically, the lower the hub-tip ratio of the blades at a given tip diameter, the smaller the diameter of the disk and hence, the load problem becomes exacerbated to a great extent. In other words by lowering the hub-tip ratio, the blading for these types of high speed fans are then supported by a disk whose diameter is reduced which places an increased burden on this smaller disk since it must be capable of withstanding substantially large loads. What is obvious is that the small diameter of the disk leaves insufficient material in the disk to accommodate a conventional blade attachment that will be capable of carrying these large blade loads.

While in some instances, integrally bladed rotors (IBR) have been utilized in advanced gas turbine engine compressors, these IBR's are not as attractive as the attachable blades when consideration is given to life cycle cost, and maintainability.

An example of a blade attachment design for the low pressure compressor or fan of a gas turbine engine is exemplified in U.S. Pat. No. 5,022,822 granted to S. M. Sincere on Jun. 11, 1991 and assigned to United Technologies Corporation, the assignee common to this patent application. As noted therein the rim and tongue and groove of the disk are designed to minimize the dead load of the disk and reduce disk size and hence, weight of the engine. Attachment schemes of this type, of necessity, must be lighter than current technology provides. Even the hollow fan blades of known technology are not sufficiently light in weight to allow the use of these attachment schemes. As is apparent from the structure in the U.S. Pat. No. 5,022,822 patent, supra, the tongue and groove is complex, requiring expensive and non-conventional machining processes imposing practical constraints when made in a production environment.

We have found that we can obviate the problems associated with the low hub-tip ratio fan blade by providing an attachment scheme that joins the airfoils to the rotor hub through sloped dovetail attachments and retain the blades axially by a segmented retainer plate located at the aft end of the attachment. A simplified blade support for radially supporting the blades under static conditions that can accommodate weights for rotor balancing for use in this configuration is contemplated.

SUMMARY OF THE INVENTION

An object of this invention is to provide an improved rotor disk and blade attachment for the compressor of a gas turbine engine for powering aircraft.

A feature of this invention is the provision of a sloped dovetail attachment for securing the airfoils to the rotor disk which attachment affords the following benefits:

1. The reduced blade neck height minimizes blade load;
2. the increased attachment length minimizes blade and disk neck tensile and bearing stress; and
3. the increased disk neck width minimizes disk neck tensile stress.

Another feature of this invention is the use of a segmented retainer plate mounted on the aft end of the rotor for supporting the blades and reacting the axial blade load.

A still further feature of this invention is to provide sufficiently deep slots accessible from the front of the rotor disk for facilitating the removal and installation of individual blades from the front of the rotor disk.

A still further feature is the utilization of a simplified blade support for supporting the blades radially in a non-operating condition and is capable of accommodating weights for dynamic balancing of the rotor.

The foregoing and other features of the present invention will become more apparent from the following description and accompanying drawings.

DETAILED DESCRIPTION OF THE PREFERRED EMBODIMENT

Figure 1:
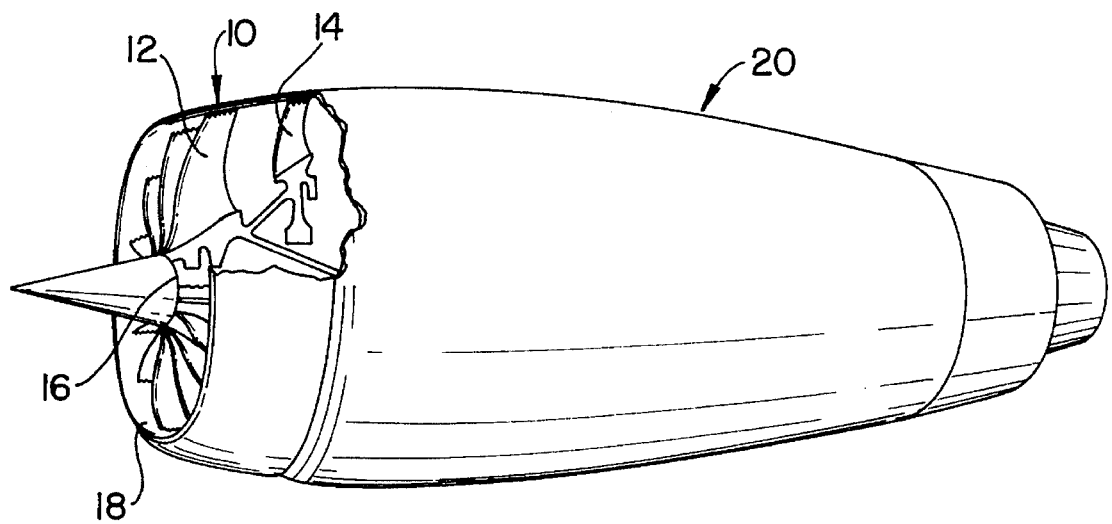
FIG. 1 is a perspective and schematic view of a gas turbine engine broken away to show a portion of the fan blades.

Referring now to FIG. 1 which illustrates the two stage fan section generally indicated by reference numeral 10 having a pair of fan rotors 12 and 14 mounted on the main low pressure engine shaft 16 for rotary motion and disposed in the inlet 18 of the fan jet gas turbine engine generally indicated by reference numeral 20. The engine may be any well known fan jet engine that includes, in addition to the fan section, a compressor section, combustion section, turbine section, exhaust section and with or with out an augmentor (none of which is shown). As is typical in these engines the air sucked into the engine is compressed by the compressor section, a portion of the pressurized air which may be diffused to convert the total pressure to a static pressure is admitted to the combustion section where fuel is combined and combusted. The now accelerated engine gasses serve to power the turbines of the turbine section and develop thrust for powering the aircraft. A portion of the energy extracted from the turbine powers the compressors and fans. The purpose of the fan is to accelerate a large mass of air to provide additional thrust and is particularly important when the engine is in the high powered operating condition. While this engine operation is generally well known, it is emphasized here to appreciate that the amount of air admitted internally into the engine and hence, engine rotational speed and the temperature at which the engine operates materially affects the performance of the engine. The requirement of the low hub-tip ratio blading operating at high tip speeds is one of the incidents material to obtaining high engine performance.

Figure 2:
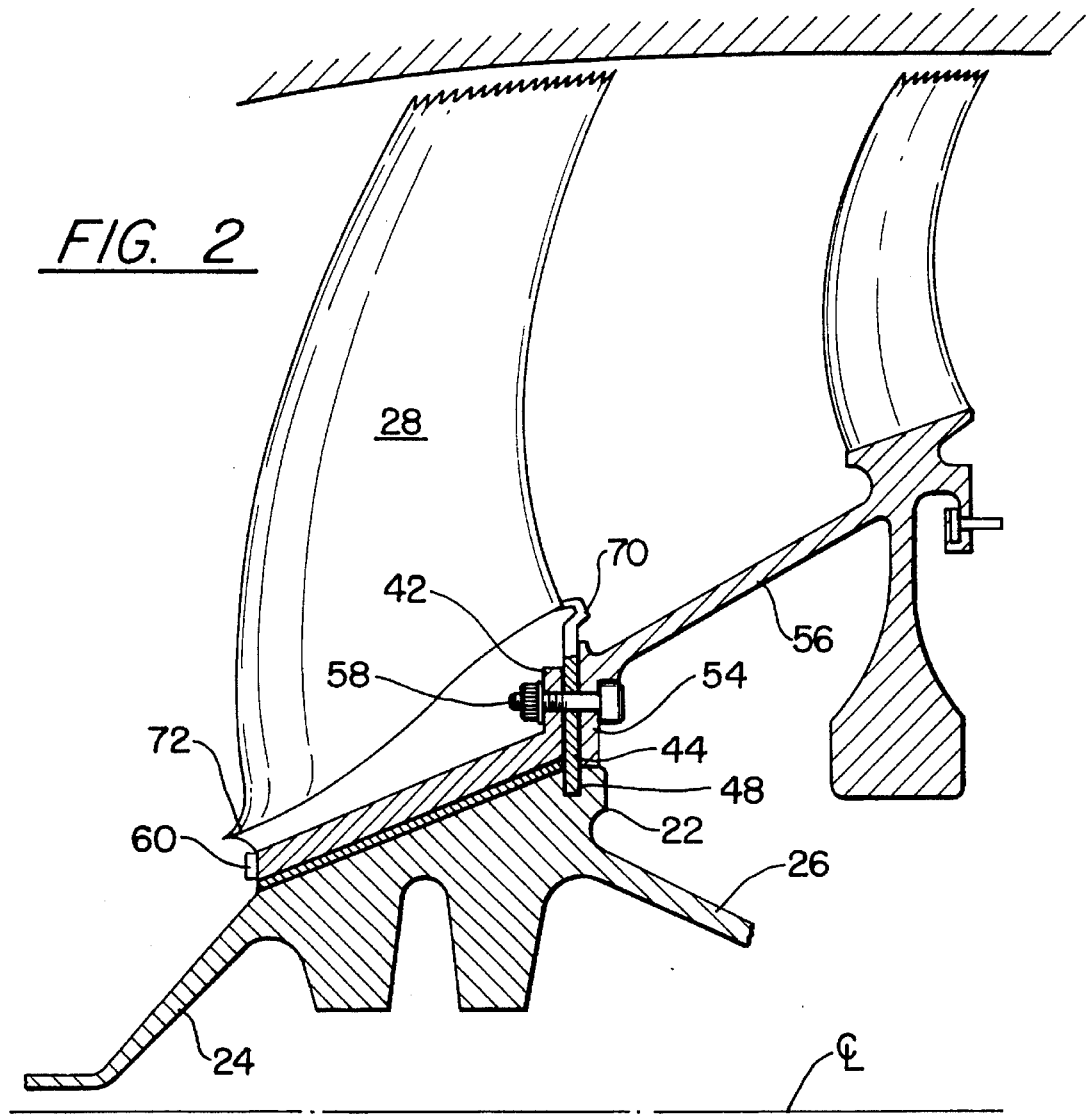
FIG. 2 is a partial view in section of a two stage fan rotor illustrating the details of this invention.
Figure 3:
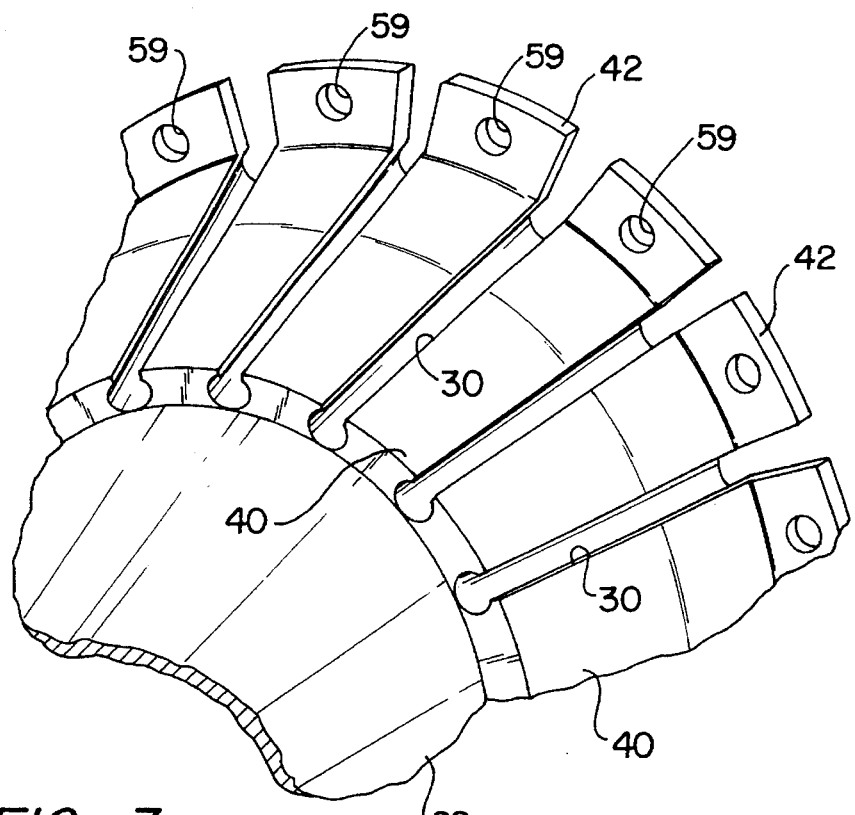
FIG. 3 is a partial view in perspective showing the rim portion of the rotor disk with the fan blades removed.

The invention can be best understood by referring to FIGS. 2–5 which show the details of the fan rotor comprising the fan disk 22 suitably attached to engine shaft via the hubs 24 and 26 and the fan airfoil 28 mounted in the sloped slot or dovetail 30 (see FIG. 2). Sloping the dovetail 30 provides the following benefits:

a. It minimizes blade loads because the blade neck height is reduced.

b. The disk neck tensile and bearing stresses are held to a minimum because of the increased attachment length.

c. The disk neck tensile stress is further minimized because of the increased disk neck width.

Figure 4:
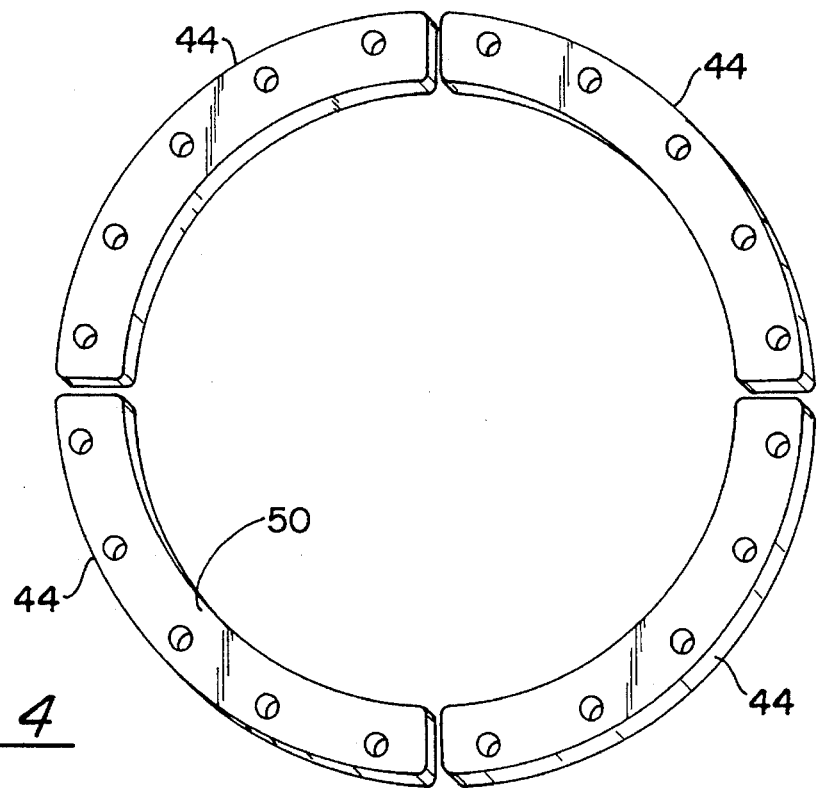
FIG. 4 is a perspective view of the segmented retainer plate of this invention.

According to this invention the disk rim 40 is configured to carry at the aft end the disk lug tangs 42 extending between adjacent slots 30. The disk lug tangs 42 as will become apparent from the foregoing serve to support the retainer plate 44 which is segmented into say, four segments, as shown in FIG. 4. The inner diameter portion of each of the segments 44 fit into an annular groove 48 formed in the outer periphery of disk 22. The front face 50 bears against the aft face of the disk lug tang 42 and is supported between it and the inner face of the depending annular portion 54 of spacer 56 and secured thereto by the tie bolt 58. Bolt 58 extends through openings 59 formed in disk lug tangs 42 and the complementary openings formed in each of the retainer plate segments 44.

Figure 5:
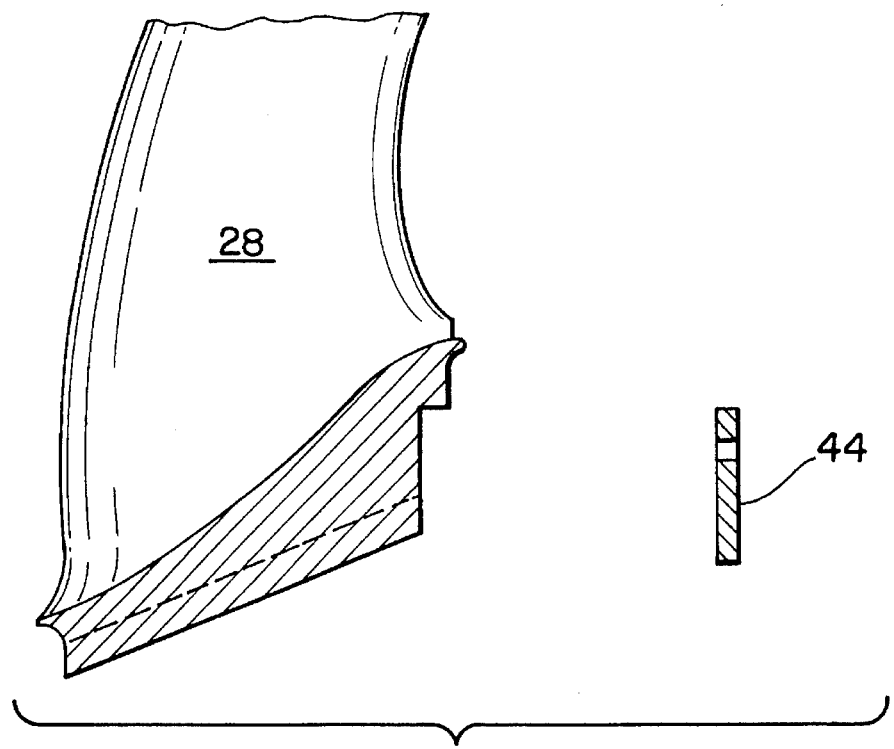
FIG. 5 is a sectional view of the blade and retainer plate illustrating the forces encountered in operation.

As noted in FIG. 5 the reaction loads represented by the arrows A located at the aft end of the blade attachment and the retainer plate 44 are reacted so as to balance the axial blade loads induced by the sloped blade 28. Snap ring 60 is mounted at the fore end of the disk 22 at the rim 40 to prevent forward movement of the blade when the engine is not operating.

An advantage of the sloped slots 30 which are relatively deep, i.e. extend beyond the bottom edge of the root of the blade, is that it allows for individual blades to be removed from the front end of the disk. This is in contrast to the heretofore method of blade removal where all the blades must be removed in order to remove a single one. To remove a single blade, the adjacent blades on both sides are dropped in their respective slot and rotated away from the blade to be removed. The center blade is then slid forward in the slot 30 while avoiding contact with either of the adjacent blades.

Figure 6:
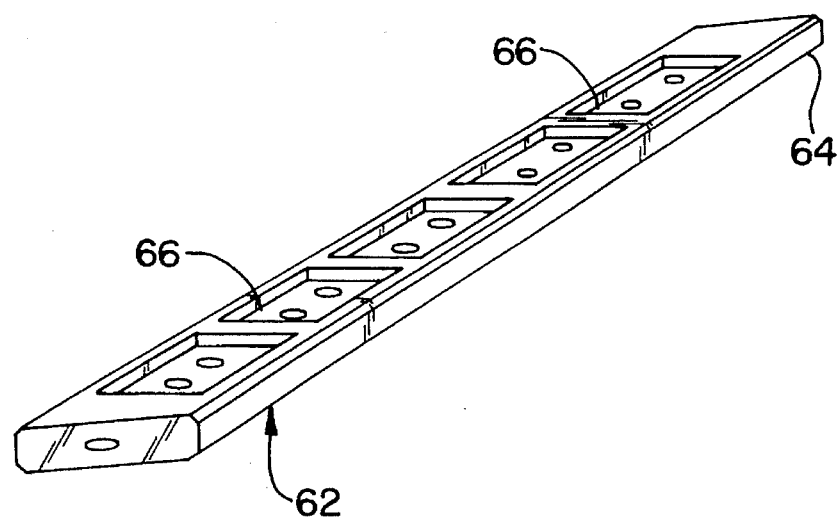
FIG. 6 is a perspective view of the blade support.

Disposed in the blade rim at each slot 30 is the blade support 62 depicted in FIG. 6 which serves to radially support the blade 28 when the engine is not operating. The blade support 62 consists of an elongated rectangularly shaped body 64 preferably made from a plastic or synthetic material that includes a plurality of spaced pockets 66 formed on either face. The pockets are dimensioned to hold metal weights that are used to dynamically balance the rotor.

An annular shaped seal plate 70 adjacent to the platform 72 of blade 28 may be utilized so as to prevent recirculation of the air in the attachment at the rim of the rotor disk.

Without limitations what has been shown by this invention are the following:

1. Low hub-tip ratio fan blade attachment capable of running at high tip speeds.

2. Sloped attachment with retainer plate secured to the disk through shear tie at the inside diameter and through the rotor tiebolt to the disk lug tang at the outside diameter.

3. Deep slot attachment to facilitate forward blade removal.

4. Blade support with integral balance feature.

5. Individual blade removal.

Although this invention has been shown and described with respect to detailed embodiments thereof, it will be appreciated and understood by those skilled in the art that various changes in form and detail thereof may be made without departing from the spirit and scope of the claimed invention.

It is claimed:

1. Attachment means for a rotor having a disk and a plurality of circumferentially spaced blades, said disk having, a fore end, and aft end, and a rim area including a plurality of cicumferentially spaced axially sloped slots formed in said rim area, a flange radially extending from said rim area adjacent one end of each of said plurality of sloped slots, an annular retainer plate having a fore face and aft face, a portion at the inner diameter of said annular retainer plate fitted into an annular groove formed in said disk, a portion of said fore face extending radially beyond said annular groove bearing against said flange, an axially disposed support structure bearing against a portion of said aft face, and means for attaching said annular retainer plate to said flange and said support structure whereby the axial loads produced by said blades during rotation of said disk are reacted by said annular retainer plate so that said blade can be configured to have a low hub to tip ratio for high speed rotation.

2. Attachment means for a rotor having a disk and a plurality of circumferentially spaced blades as claimed in claim 1 wherein said annular retainer plate is segmented.

3. Attachment means for a rotor having a disk and a plurality of circumferentially spaced blades as claimed in claim 2 wherein said annular retainer plate is segmented in four segments.

4. Attachment means for a rotor having a disk and a plurality of circumferentially spaced blades as claimed in claim 3 wherein said means for attaching said annular retainer plate is a tie bolt.

5. Attachment means for a rotor having a disk and a plurality of circumferentially spaced blades as claimed in claim 4 wherein each of said sloped slots are relatively deep allowing each of said plurality of blades to drop below a predetermined area in said sloped slot whereby each blade can be individually removed from said disk.

6. Attachment means for a rotor having a disk and a plurality of circumferentially spaced blades as claimed in claim 5 including a snap ring mounted on the fore end of said disk adjacent said sloped slots for preventing forward movement of said blades during non-rotation of said rotor.

7. Attachment means for a rotor having a disk and a plurality of circumferentially spaced blades as claimed in claim 6 wherein said slope extends radially and axially from the fore end of said disk to the aft end of said disk.

8. Attachment means for a rotor having a disk and a plurality of circumferentially spaced blades as claimed in claim 7 wherein said support structure is a spacer mounted for rotational movement.

9. Attachment means for a rotor having a disk and a plurality of circumferentially spaced blades as claimed in claim 1 wherein said means for attaching said annular retainer plate includes a tie bolt.

10. Attachment means for a rotor having a disk and a plurality of circumferentially spaced blades as claimed in claim 1 including at least one blade support disposed in said slot between said blade and said rim area.

11. Attachment means for a rotor having a disk and a plurality of circumferentially spaced blades as claimed in claim 10 wherein said blade support is an elongated member having a plurality of axially spaced pockets for retaining weights for dynamically balancing said rotor.

12. Attachment means for a fan or compressor rotor for a gas turbine engine, said rotor having a disk including a fore end and an aft end, a plurality of circumferentially spaced blades, and a rim area including a plurality of cicumferentially spaced axially sloped slots formed in said rim area, a flange radially extending from said disk in said rim area adjacent one end of each of said plurality of sloped slots, an annular retainer plate having a fore face and aft face, a portion at the inner diameter of said annular retainer plate fitted into an annular groove formed in said disk, a portion of said fore face extending radially beyond said annular groove bearing against said flange, an axially disposed support structure bearing against a portion of said aft face, and tie bolt means for attaching said annular retainer plate to said flange and said support structure whereby the axial loads produced by said blades during rotation of said disk are reacted by said annular retainer plate so that said blade can be configured to have a low hub to tip ratio for said fan or compressor to operate at relatively high rotational speeds.

13. Attachment means for a fan or compressor rotor of a gas turbine engine as claimed in claim 12 wherein said annular retainer plate is segmented.

14. Attachment means for a fan or compressor rotor of a gas turbine engine as claimed in claim 13 including a second fan or compressor rotor axially spaced from said fan or compressor rotor, a spacer interconnecting said fan and compressor rotor and said second fan and compressor rotor for common rotation thereof, said means for attaching said annular retainer plate is a tie bolt extending through said spacer.

15. Attachment means for a fan or compressor rotor of a gas turbine engine as claimed in claim 14 wherein each of said sloped slots is relatively deep allowing each of said plurality of blades to drop below a predetermined area in said sloped slot whereby each blade can be individually removed from said disk.

16. Attachment means for a fan or compressor rotor of a gas turbine engine as claimed in claim 15 including a snap ring mounted on the fore end of said disk adjacent said sloped slots for preventing forward movement of said blades during non-rotation of said fan or compressor rotor.

17. Attachment means for a fan or compressor rotor of a gas turbine engine as claimed in claim 16 wherein said slope extends radially and axially from the fore end of said disk to the aft end of said disk.

18. Attachment means for a rotor having a disk and a plurality of circumferentially spaced blades as claimed in claim 17 including at least one blade support disposed in said slot between said blade and said rim area.

19. Attachment means for a fan or compressor rotor of a gas turbine engine as claimed in claim 18 wherein said blade support is an elongated member having a plurality of axially spaced pockets for retaining weights for dynamically balancing said fan or compressor rotor.

* * * * *

UNITED STATES PATENT AND TRADEMARK OFFICE
CERTIFICATE OF CORRECTION

PATENT NO. : 5,501,575
DATED : March 26, 1996
INVENTOR(S) : Eldredge et al

It is certified that error appears in the above-identified patent and that said Letters Patent is hereby corrected as shown below:

In the abstract on Line 3 change the word "he" to -- the --; and on Line 6 after the words "of the" insert --rim--

Signed and Sealed this

Twentieth Day of August, 1996

*Attest:*

BRUCE LEHMAN

*Attesting Officer*     *Commissioner of Patents and Trademarks*